United States Patent
Woollen

(10) Patent No.: US 7,428,733 B2
(45) Date of Patent: Sep. 23, 2008

(54) SYSTEM AND METHOD FOR CUSTOM MODULE CREATION AND DEPLOYMENT

(75) Inventor: Rob Woollen, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 328 days.

(21) Appl. No.: 10/961,304

(22) Filed: Oct. 8, 2004

(65) Prior Publication Data

US 2005/0257217 A1  Nov. 17, 2005

Related U.S. Application Data

(60) Provisional application No. 60/570,953, filed on May 13, 2004.

(51) Int. Cl.
G06F 9/445 (2006.01)
G06F 9/54 (2006.01)
G06F 9/46 (2006.01)

(52) U.S. Cl. ..................... 719/315; 717/177; 719/316

(58) Field of Classification Search ................. 719/315, 719/316; 717/177
See application file for complete search history.

(56) References Cited

U.S. PATENT DOCUMENTS

| | | | |
|---|---|---|---|
| 5,835,777 A | 11/1998 | Staelin | |
| 5,911,071 A | 6/1999 | Jordan | |
| 6,128,647 A | 10/2000 | Haury | |
| 6,529,992 B1 | 3/2003 | Thomas | |
| 6,721,777 B1 | 4/2004 | Sharma | |
| 6,738,789 B2 | 5/2004 | Multer et al. | |
| 6,751,797 B1 * | 6/2004 | Desgranges et al. | 719/315 |
| 6,766,324 B2 * | 7/2004 | Carlson et al. | 707/10 |
| 6,779,002 B1 | 8/2004 | Mwaura | |
| 6,829,575 B2 * | 12/2004 | Freund et al. | 707/10 |
| 6,892,382 B1 * | 5/2005 | Hapner et al. | 717/174 |
| 6,922,695 B2 | 7/2005 | Skufea et al. | |
| 6,934,532 B2 | 8/2005 | Coppinger et al. | |
| 6,970,924 B1 | 11/2005 | Chu | |
| 7,069,553 B2 | 6/2006 | Narayanaswamy | |
| 7,086,065 B1 * | 8/2006 | Yeluripati et al. | 719/311 |
| 7,107,592 B2 | 9/2006 | Taylor | |
| 2002/0049744 A1 | 4/2002 | Nakos | |
| 2002/0078132 A1 | 6/2002 | Cullen | |
| 2003/0093717 A1 * | 5/2003 | Mason | 714/38 |
| 2003/0101435 A1 | 5/2003 | Takahashi et al. | |
| 2003/0158919 A1 * | 8/2003 | Fomenko | 709/220 |
| 2003/0204784 A1 | 10/2003 | Jorapur | |

(Continued)

OTHER PUBLICATIONS

Gary J. Vecellio et al., "Container Services for High Confidence Software," Jun. 10-14, 2002, Seventh International Workshop on Component-Oriented Programming.*

(Continued)

*Primary Examiner*—Li B Zhen
(74) *Attorney, Agent, or Firm*—Fliesler Meyer LLP

(57) ABSTRACT

In accordance with one embodiment of the present invention applications are configured with custom modules. A deployment descriptor of an application includes a definition for a new container type and modules of the new container type. A deployment system reads the deployment descriptor and implements the modules of the new container type. The new containers are then available to assist in the deployment of the application.

20 Claims, 6 Drawing Sheets

U.S. PATENT DOCUMENTS

| | | | |
|---|---|---|---|
| 2004/0068537 A1* | 4/2004 | Freund et al. | 709/202 |
| 2004/0068553 A1* | 4/2004 | Davis et al. | 709/218 |
| 2004/0068731 A1 | 4/2004 | Davis et al. | |
| 2004/0088681 A1 | 5/2004 | Berg | |
| 2004/0255294 A1 | 12/2004 | Spotwood | |
| 2005/0005200 A1* | 1/2005 | Matena et al. | 714/38 |
| 2005/0138076 A1* | 6/2005 | Seo et al. | 707/104.1 |

OTHER PUBLICATIONS

Christopher K. Hess et al., "An Adaptive Data Object Service for Pervasive Computing Environments," Dec. 4, 2000, pp. 1-27.*

Chappell, Dave, et al., "Java Message Service," O'Reilly, Dec. 2000.

Taylor, Art, "J2EE and Beyond: Design, Develop, and Deploy World-Class Java™ Software," Prentice-Hall, Dec. 23, 2002.

Guo, Y., et al., "Developing a Distributed Scalable Java Component Server," Future Generation Computer Systems, May 24, 2001, vol. 17, Issue 8, pp. 1051-1057.

Microsoft Computer Dictionary, Fifth Edition, Microsoft Press, 2002; pp. 115, 176, 542.

Red Hat, Inc., "JBoss Enterprise Application Platform: Configuration Guide, 4.2.0, Chapter 14, EJBs on JBoss," 2007, pp. 470-472.

* cited by examiner

US 7,428,733 B2

SYSTEM AND METHOD FOR CUSTOM MODULE CREATION AND DEPLOYMENT

PRIORITY CLAIM

The present application is a nonprovisional of U.S. Patent Application No. 60/570,953, filed on May 13, 2004, entitled SYSTEM AND METHOD FOR CUSTOM MODULE CREATION AND DEPLOYMENT, Inventor: Rob Woolen, the contents of which are incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to systems, methods, and machine readable media for creating and deploying applications in the Java operating system. More specifically, it relates creating and deploying applications with new container types.

BACKGROUND OF THE INVENTION

Since its inception in 1995, the Java programming language has become increasingly popular. Java, which is an interpreted language, enabled the creation of applications which could be run on a wide variety of platforms. This ability to function across a variety of different client platforms and Java's relatively easy implementation of network applications has resulted in its use in endeavors as basic as personal web pages to endeavors as complex as large business-to-business enterprise systems.

As Java has become more commonplace, a wide variety of tools and development platforms have been created to assist developers in the creation and implementation of Java applications. These platforms allow users to work with previously generated modules, thus reducing overlapped efforts.

While the conveniences provided by these platforms have enhanced and improved the development process, they have added additional rigidity as well. Developers are often limited to modules or module types having code that was shipped with the platform. The developers are often unable to use their own container types or customized modules without significant additional effort.

DETAILED DESCRIPTION

In accordance with one embodiment of the present invention applications are configured with custom modules. A deployment descriptor of an application includes a definition for a new container type and modules of the new container type. A deployment system reads the deployment descriptor and implements the modules of the new container type. The new containers are then available to assist in the deployment of the application.

Figure 1:
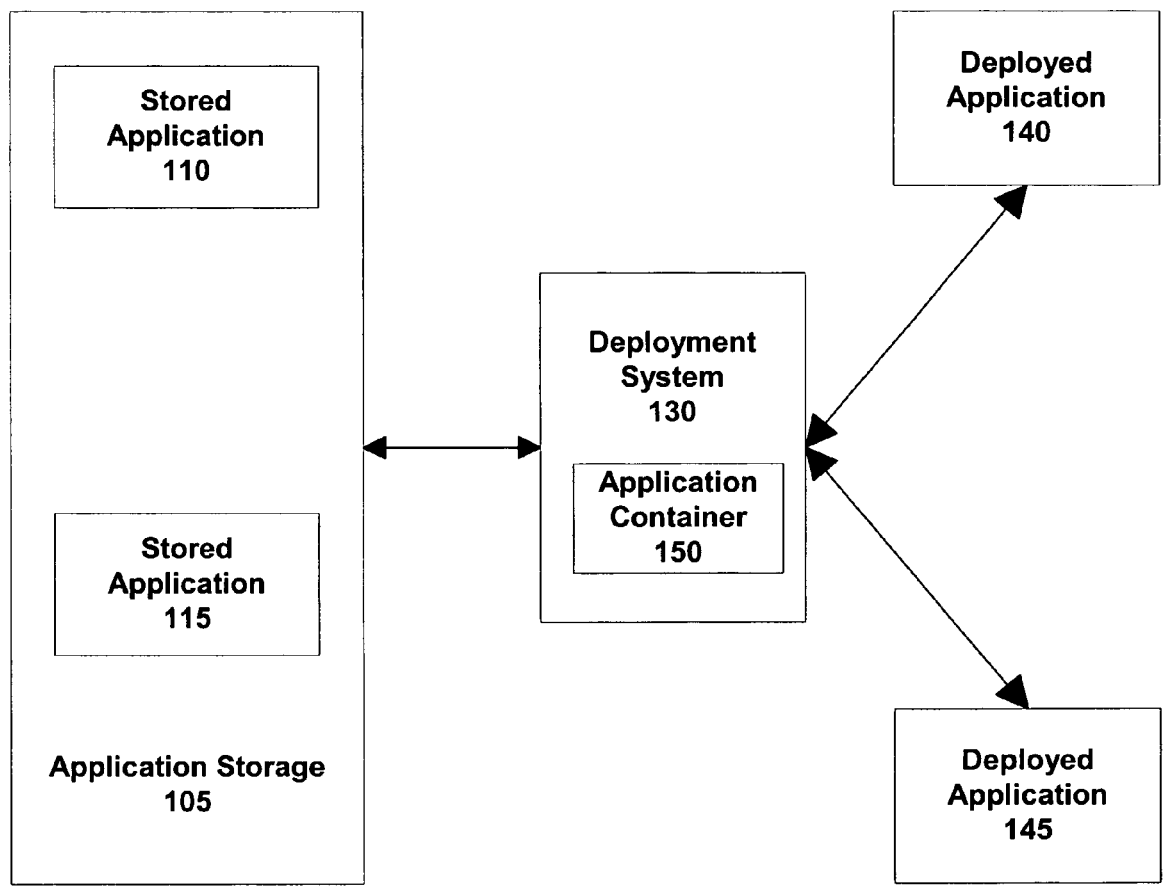
FIG. 1 illustrates an overview of an application deployment environment in accordance with one embodiment of the present invention.

FIG. 1 illustrates an overview of an application deployment environment in accordance with one embodiment of the present invention. A server storage 105 stores multiple stored applications 110, 115 previous to deployment. The applications are preferably stored as archives for deployment by a deployment system 130. In one embodiment, the applications are stored in the form of Enterprise ARchive (EAR) files. The stored applications 110, 115 include modules containing the functionality of the applications and deployment descriptors that indicate to the deployment system 130 how the applications 110, 115 should be deployed. The modules can include both conventional modules, having module types that are known to the deployment system 130, as well as custom modules including the functionality for new container types.

The deployment system 130 is responsible for deploying the stored applications 110, 115 from the server storage to generate the deployed applications 140, 145. In one embodiment, the deployment system runs when the server is started and automatically deploys a group of preselected applications. In an alternate embodiment, the deployment system allows a system administrator to manually select which applications are deployed. The deployment system checks the deployment descriptors of each of the stored applications 110, 115 to locate the modules used by the application within that application's EAR file and to deploy the application. The deployed applications are then available for use by remote clients or any party interacting with the server. In some embodiments, the deployment system includes an application container 140. The application container 140 serves as an intermediary layer between a deployment subsystem of the deployment system 130 and the containers of an application server on which the applications will be deployed. The application container performs application classloading, Java Naming and Directory Interface (JNDI), file management, and parsing of deployment descriptors.

Figure 2:
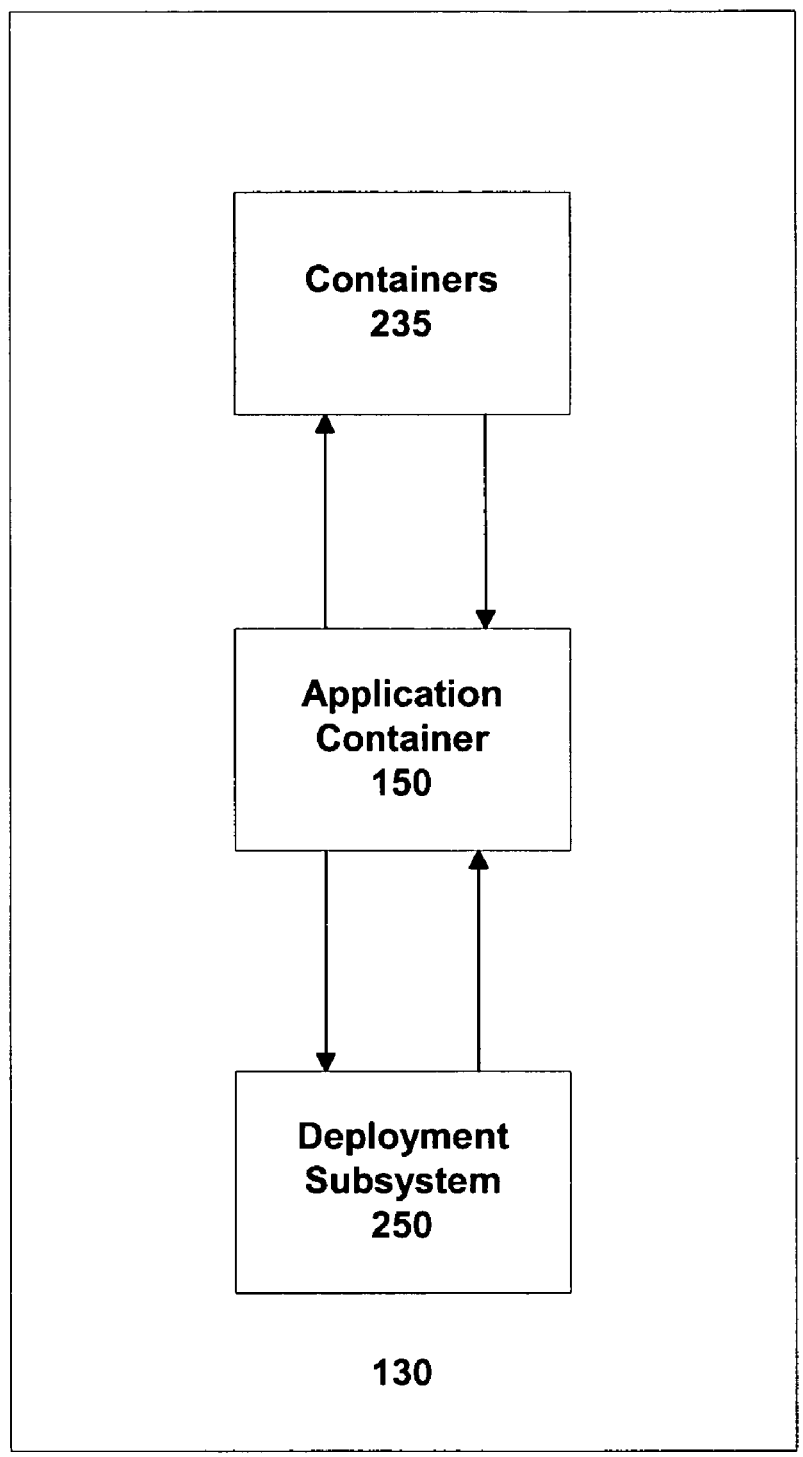
FIG. 2 illustrates a closer view of a deployment system.

FIG. 2 illustrates a closer view of a deployment system 130. The deployment system includes containers 235, the application container 150, and the deployment subsystem 250. The deployment subsystem includes functionality for extracting archived modules and loading them into system memory. The containers 235 can be standard containers that are designed to manage components such as Enterprise Java Beans (EJBs) or connectors, or custom containers generated through custom modules. The application container 150 defines the interface through which the containers 235 interface with the deployment subsystem. This interface can be extended through custom modules stored within applications. The application container 150 includes a state machine and performs application classloading and JNDI services.

The containers 235 are modules running on the application server on which the applications are to be deployed. The containers 235 provide runtime support and deployment assistance for components such as EJBs, JSPs, and servlets. The application container 150 interacts with the containers 235 through a standardized interface which allows the application container to recognize and deploy modules of previously defined types.

The containers may be implemented through the server's original configuration. Alternately, the containers may be implemented through custom modules stored within an application. For example, an application can be configured with custom modules containing code for new container types. The deployment system can, upon reading the deployment descriptor of the application detect the presence of a new container, and implement the new container. The new container is then available for use in deploying the application.

The containers implement a ModuleFactory for each container type, the ModuleFactory configured to return instances of its associated module. The application container, when parsing a deployment descriptor, detects a call for a module of a particular type and returns an instance of that module.

Figure 3:
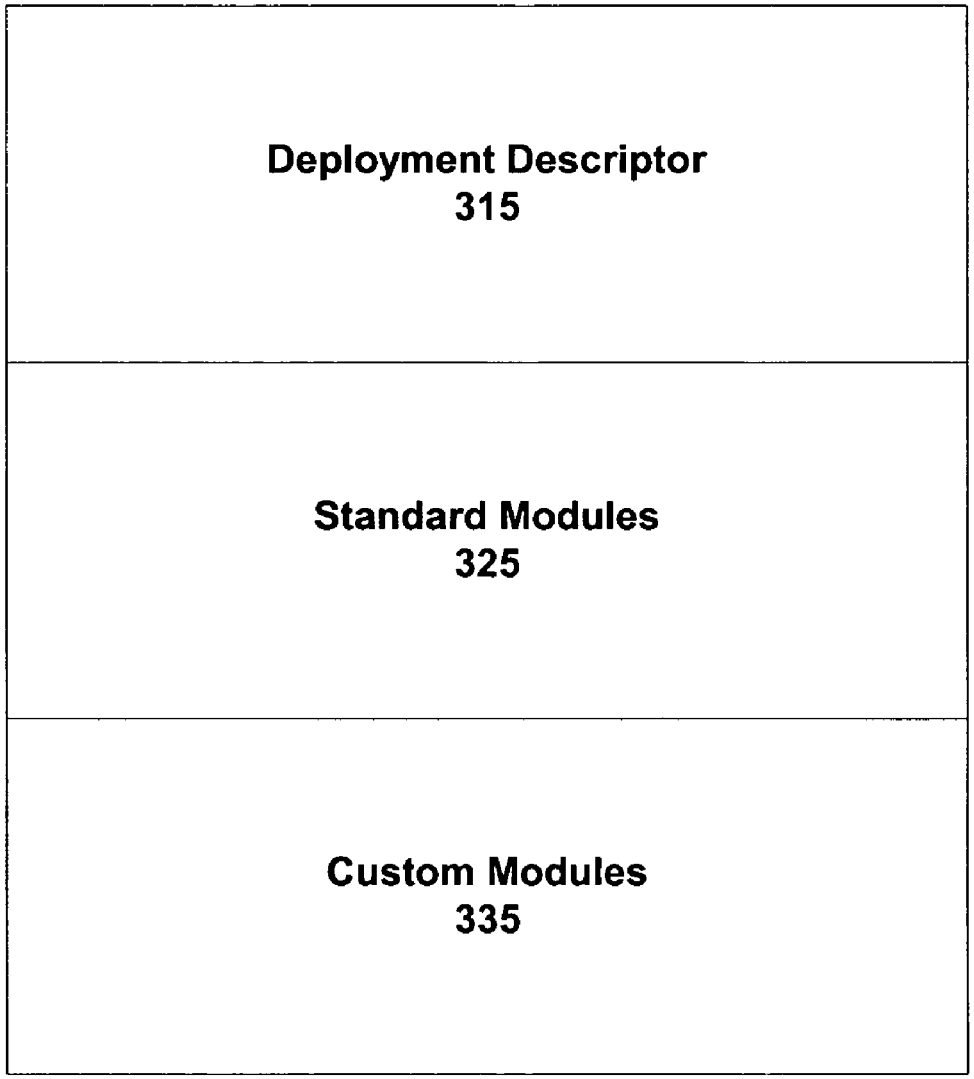
FIG. 3 illustrates a closer view of an application in accordance with one embodiment of the present invention.

FIG. 3 illustrates a closer view of a stored application in accordance with one embodiment of the present invention. The application is configured to be extracted by a deployment system 130 and to be deployed on a server. The stored application includes a deployment descriptor 315, standard modules 325, and custom modules 335. The deployment descriptor 315 identifies the application, the modules within the application, and any special or distinct characteristics of the application. The deployment descriptor can include an application.xml file, weblogic-application.xml file, a weblogic-extension.xml file, or any other manner of descriptor. The deployment descriptor additionally includes declarations of any new module types that an application developer has created.

The application additionally includes standard modules 325. The standard modules 325 are program units that provide the functionality for the application. The modules 325 can be common modules such as libraries, administrative web applications, Enterprise Java Beans (EJBs), Java Messaging System (JMS) modules, Java DataBase Connectivity (JDBC) modules, or any other modules that might be made available for the application. These modules 325 are supported by the server as originally configured and do not require separate declarations of their module types.

The custom modules 335 are modules associated with newly created container types which have been created for use in the application 105. The new types of custom modules are declared in the deployment descriptor 315. The application container 150 detects the declarations when parsing the deployment descriptor and configures itself to allow the deployment of modules of the new container type. The modules 335 contain the code for implementing the new container types declared in the deployment descriptor and once deployed are available, as the new containers, to assist in the deployment of the remainder of the application.

Figure 4:
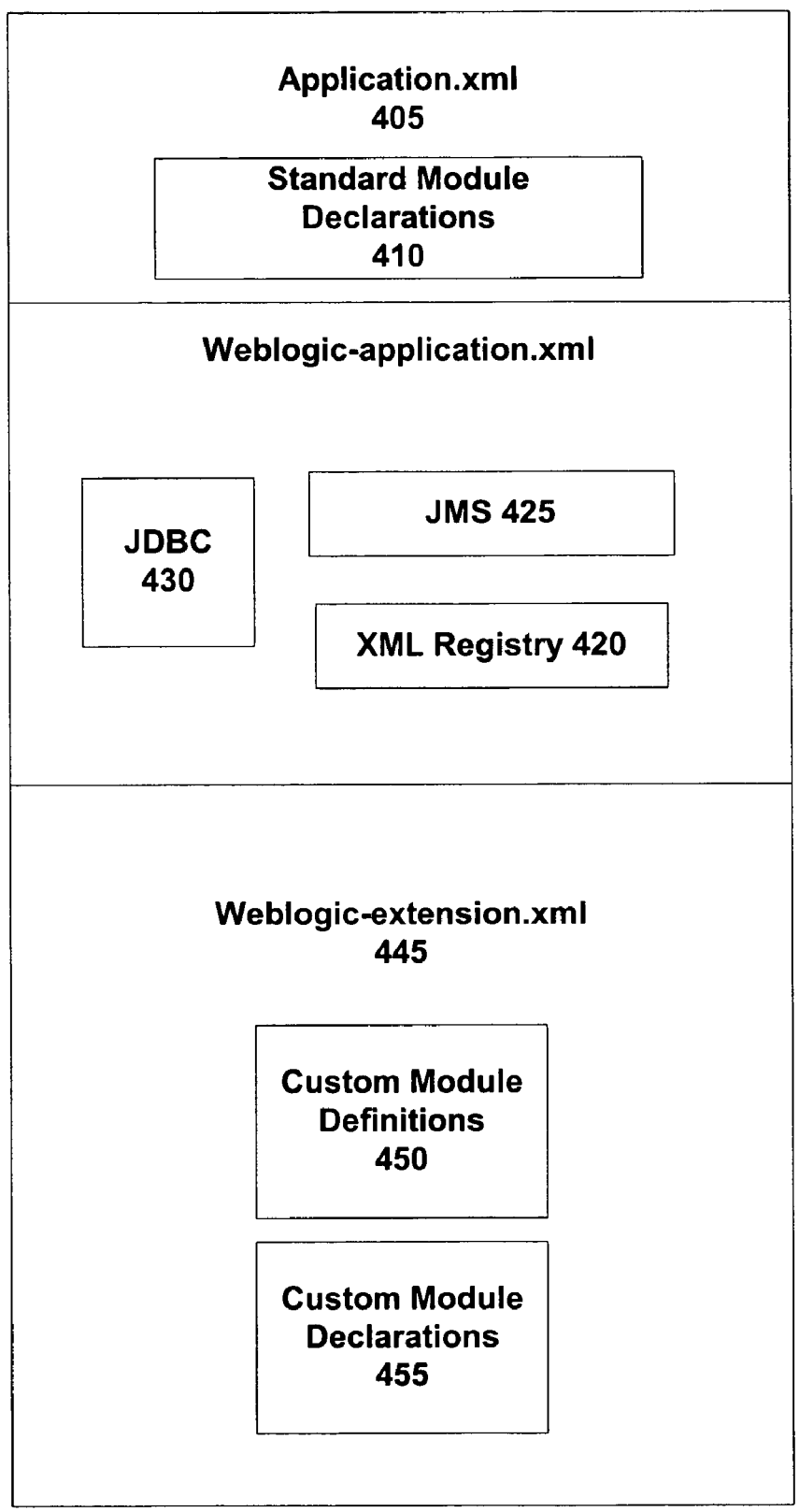
FIG. 4 illustrates a closer view of a deployment descriptor of an application in accordance with one embodiment of the present invention.

FIG. 4 illustrates a closer view of a deployment descriptor 315 of an application in accordance with one embodiment of the present invention. The deployment descriptor 315 identifies the application, the modules within the application, and any special or distinct characteristics of the application. The deployment descriptor includes an application.xml file 405. The application.xml file 405 includes standard module declarations 410. The application.xml file 405 additionally includes information necessary for representing the application in different GUI tools and other basic information for identifying and deploying the application. The standard module declarations 410 include declarations for standard Java modules and their respective paths in the EAR file storing the application. The modules declared in the application.xml file include standard Java modules such as Enterprise Java Beans (EJBs), web applications, connectors, and any other standard Java modules.

The deployment descriptor 315 additionally includes weblogic-application.xml, and weblogic-extension.xml files. While in the present embodiment, these files are referred to as "weblogic-application.xml" and "weblogic-extension.xml" they can in fact have any title and broadly refer to deployment descriptor files supplementing deployment information provided in the application.xml file 405.

The weblogic-application.xml file includes platform specific deployment information. The weblogic-application.xml file includes configuration information for database access through JDBC 425 as well as JMS configuration information 430 for messaging within the application as well with other applications. The JMS configuration 425 and JDBC configuration can be general or server specific configuration information. The weblogic-application.xml deployment descriptor additionally includes an XML registry indicating the parameters for XML interaction between the application and other components.

Additionally, the weblogic-application.xml file can include a module deployment order specifying the order in which modules are deployed. If no module deployment order appears in the weblogic-application.xml file, the modules are deployed according to a previously set default order.

The weblogic-extension.xml file 445 includes custom module definitions 450 and custom module declarations 455. The custom module definitions 450 indicate a new container type and a module class and module factory class for the custom module. The custom module declarations 455 include instances of the new container type within the application. Each of the declarations 455 makes reference to the new container type defined in the custom module definitions 450. Shown below is one embodiment of a weblogic-extension.xml file in which a container type is defined and two instances of the container are declared.

<module-provider>
<name> PortalModule </name>
<module-class> com.bea.portal.PortalModule</Module-class>
<module-factor-class>com.bea.PortalModuleFactory</module-factory-class>
<module>
<uri>Myportal.xml</uri>
<provider-name>PortalModule </provider-name>
</module>
<module>
<uri> AnotherPortal.xml <uri>
<provider-name> PortalModule </provider-name>
</module>

Figure 5:
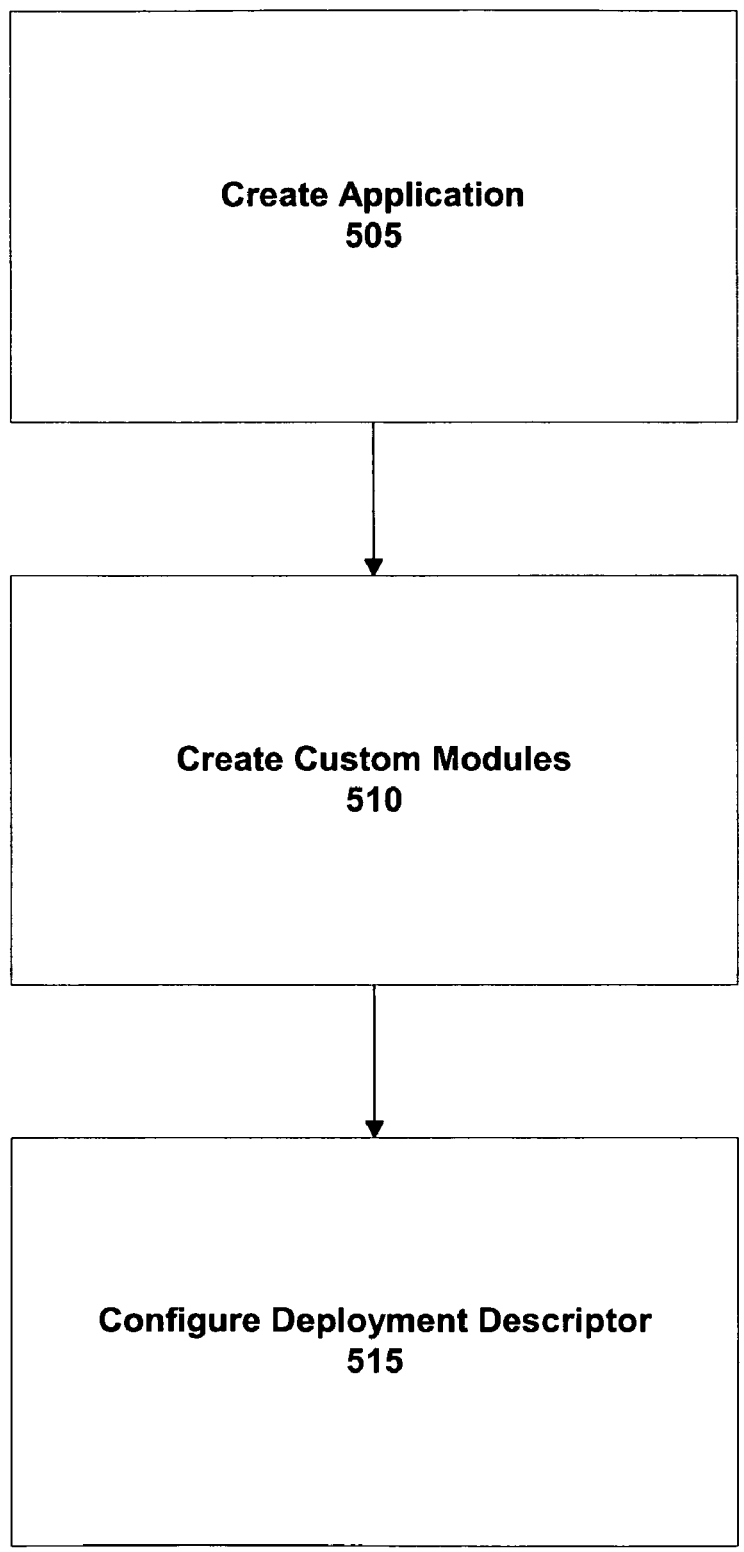
FIG. 5 illustrates a process for creating an application with custom modules in accordance with one embodiment of the present invention.

FIG. 5 illustrates a process for creating an application with custom modules in accordance with one embodiment of the present invention. The process begins in step 505, with an application being created. The creation of the application entails the generation of the various modules and descriptors which execute the functionality of the application.

In step 510, the custom modules are created. The custom modules include code for implementing new container types that are defined in the deployment descriptors. The custom modules include interface components governing how the modules interact with the application container 150. The custom modules are then stored within the archive file storing the application.

In step 515, the deployment descriptors are configured. The deployment descriptors include application.xml and weblogic.application.xml extension files that include declarations for the various standard modules that are stored within the application. The deployment descriptors may additionally include a deployment order for the modules.

Figure 6:
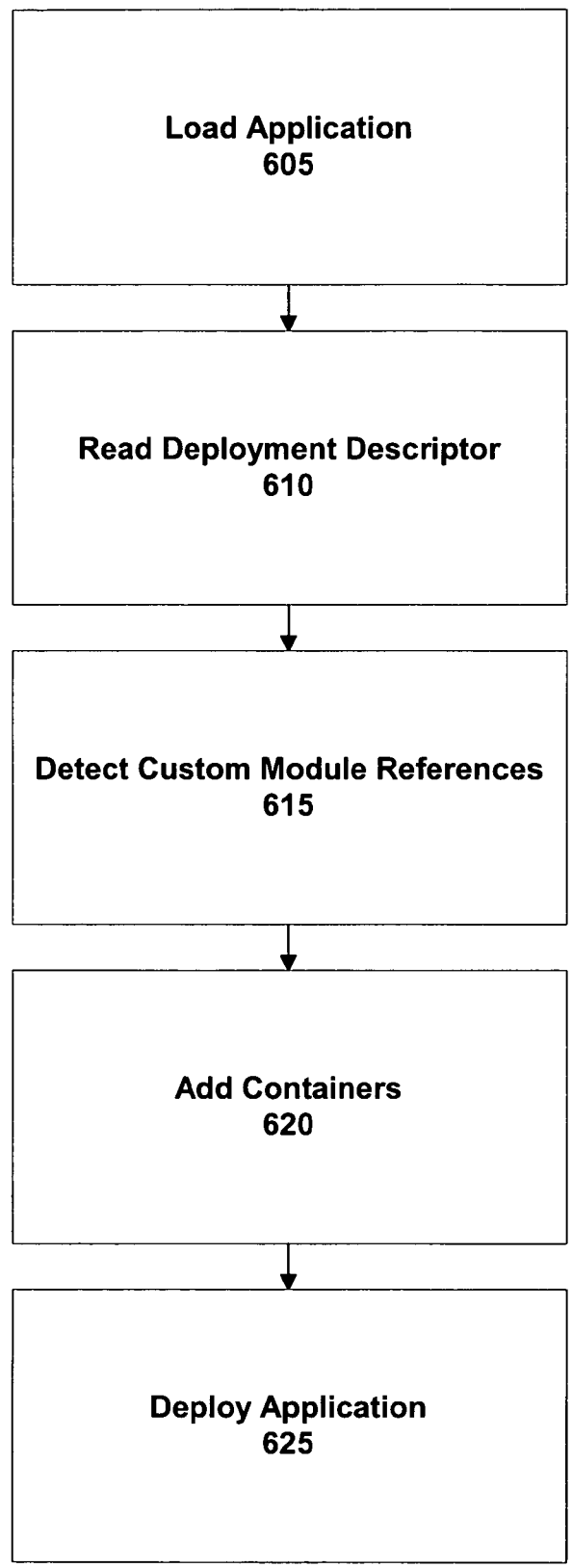
FIG. 6 illustrates a process for deploying an application with custom modules in accordance with one embodiment of the present invention.

FIG. 6 illustrates a process for deploying an application with custom modules in accordance with one embodiment of the present invention. In step 605 the deployment system reads the archive file storing the application. The archive file is stored on a storage of the server. The deployment system then reads the deployment descriptor of the application in step 610. The deployment system parses the deployment descriptor and gathers the locations of the various modules stored within the application so that they can be accessed during deployment.

In step 615, the deployment system reads the deployment descriptor and detects references to the custom modules within the deployment descriptor. The deployment descriptor includes a definition of the new container type and instances of the new container in the application.

In step 620, the deployment system implements the new containers for use with the server. The new containers are included among the containers 235 illustrated in FIG. 2. The containers are at this point available to provide deployment and runtime services for the application. In step 625, the deployment system deploys the other modules within the application. The new containers assist in the deployment of the remainder of the application and are available to be utilized by the application once deployed.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for deploying an application on a server, the server comprising a plurality of associated container types, the method comprising:

storing in a deployment descriptor of the application a definition for an additional container type, wherein the additional container type is not among the plurality of associated container types and wherein the deployment descriptor contains the definition for the additional container type and one or more module declarations, wherein the definition for the additional container type indicates a module class and module factory class for the one or more modules, wherein each module declaration includes one or more instances of the additional container type within the application;

storing the deployment descriptor of the application in an archive file;

storing in the archive file one or more modules associated with the plurality of associated container types and one or more modules associated with the additional container type, wherein the one or more modules associated with the additional container type include code for implementing the additional container type defined in the deployment descriptor;

loading the archive file onto the server and extracting files from the archive file;

reading the deployment descriptor of the application;

creating one or more containers for the one or more modules associated with the plurality of associated container types and one or more containers of the additional container type for the one or more modules associated with the additional container type; and deploying the one or more modules associated with the plurality of associated container types into their respective containers and one or more modules associated with the additional container type into the one or more containers of the additional container type.

2. The method of claim 1, further comprising declaring in the deployment descriptor a reference to the one or more modules associated with the additional container type.

3. The method of claim 1, wherein the deployment descriptor is an eXtensible Markup Language (XML) file.

4. The method of claim 1, further comprising configuring the one or more modules associated with the additional container type to assist in a deployment of the application.

5. The method of claim 1, wherein the application is a web application.

6. The method of claim 1, wherein the deployment descriptor includes a module deployment order specifying the order in which the one or more modules are deployed.

7. The method of claim 1, wherein each of the module declarations references the additional container type.

8. The method of claim 1, wherein the one or more modules include interface components governing how the one or more modules interact.

9. A computer-readable storage medium, storing instructions for deploying an application on a server, the server comprising a plurality of associated container types, the instructions comprising:

storing in a deployment descriptor of the application a definition for an additional container type, wherein the additional container type is not among the plurality of associated container types and wherein the deployment descriptor contains the definition for the additional container type and one or more module declarations, wherein the definition for the additional container type indicates a module class and module factory class for the one or more modules, wherein each module declaration includes one or more instances of the additional container type within the application;

storing the deployment descriptor of the application in an archive file;

storing in the archive file one or more modules associated with the plurality of associated container types and one or more modules associated with the additional container type, wherein the one or more modules associated with the additional container type include code for implementing the additional container type defined in the deployment descriptor;

loading the archive file onto the server and extracting files from the archive file;

reading the deployment descriptor of the application;

creating one or more containers for the one or more modules associated with the plurality of associated container types and one or more containers of the additional container type for the one or more modules associated with the additional container type; and deploying the one or more modules associated with the plurality of associated container types into their respective containers and one or more modules associated with the additional container type into the one or more containers of the additional container type.

10. The computer-readable storage medium of claim 9, further comprising declaring in the deployment descriptor a reference to the one or more modules associated with the additional container type.

11. The computer-readable storage medium of claim 9, wherein the deployment descriptor is an eXtensible Markup Language (XML) file.

12. The computer-readable storage medium of claim 9, further comprising configuring the one or more modules associated with the additional container type to assist in a deployment of the application.

13. The computer-readable storage medium of claim 9, wherein the application is a web application.

14. The computer-readable storage medium of claim 9, wherein the deployment descriptor includes a module deployment order specifying the order in which the one or more modules are deployed.

15. The computer-readable storage medium of claim 9, wherein each of the module declarations references the additional container type.

16. The computer-readable storage medium of claim 9, wherein the one or more modules include interface components governing how the one or more modules interact.

17. A method for deploying an application on a server, comprising:

storing in a deployment descriptor for the application a definition for an additional container type, wherein the additional container type is not among a plurality of container types associated with the server and wherein the deployment descriptor contains the definition for the additional container type and one or more module declarations, wherein the definition for the additional container type indicates a module class and module factory class, wherein the one or more module declarations describe one or more instances of the additional container type within the application;

storing in an archive file one or more modules associated with the plurality of associated container types and one or more modules associated with the additional container type, wherein the one or more modules associated with the additional container type include code for implementing the additional container type defined in the deployment descriptor;

reading the deployment descriptor of the application;

creating one or more containers for the one or more modules associated with the plurality of associated container types and one or more containers of the additional container type for the one or more modules associated with the additional container type; and deploying the one or more modules associated with the plurality of associated container types into their respective containers and the one or more modules associated with the additional container type into their respective containers of the additional container type.

18. The method of claim 17, wherein one or more of the module declarations references the additional container type.

19. A computer-readable storage medium, storing instructions for deploying an application on a server, the instructions comprising:

storing in a deployment descriptor for the application a definition for an additional container type, wherein the additional container type is not among a plurality of container types associated with the server and wherein the deployment descriptor contains the definition for the additional container type and one or more module declarations, wherein the definition for the additional container type indicates a module class and module factory class, wherein the one or more module declarations describe one or more instances of the additional container type within the application;

storing in an archive file one or more modules associated with the plurality of associated container types and one or more modules associated with the additional container type, wherein the one or more modules associated with the additional container type include code for implementing the additional container type defined in the deployment descriptor;

reading the deployment descriptor of the application;

creating one or more containers for the one or more modules associated with the plurality of associated container types and one or more containers of the additional container type for the one or more modules associated with the additional container type; and deploying the one or more modules associated with the plurality of associated container types into their respective containers and the one or more modules associated with the additional container type into their respective containers of the additional container type.

20. The computer-readable storage medium of claim 19, wherein one or more of the module declarations references the additional container type.

* * * * *

UNITED STATES PATENT AND TRADEMARK OFFICE
CERTIFICATE OF CORRECTION

PATENT NO. : 7,428,733 B2  
APPLICATION NO. : 10/961304  
DATED : September 23, 2008  
INVENTOR(S) : Woollen Page 1 of 1

It is certified that error appears in the above-identified patent and that said Letters Patent is hereby corrected as shown below:

In column 4, line 45, delete "Module" and insert -- module --, therefor.

In column 4, line 50, delete "Myportal" and insert -- MyPortal --, therefor.

Signed and Sealed this

Sixteenth Day of March, 2010

David J. Kappos
*Director of the United States Patent and Trademark Office*